July 27, 1926.

M. L. LANGFORD

COTTON CHOPPER

Filed August 21, 1925    2 Sheets-Sheet 1

1,593,941

INVENTOR.
Marcus L. Langford.

BY

Hardway & Cathey
ATTORNEYS

July 27, 1926. 1,593,941

M. L. LANGFORD

COTTON CHOPPER

Filed August 21, 1925 2 Sheets-Sheet 2

INVENTOR.
Marcus L. Langford
BY
Hardway Cathey
ATTORNEYS.

Patented July 27, 1926.

1,593,941

UNITED STATES PATENT OFFICE.

MARCUS L. LANGFORD, OF MART, TEXAS.

COTTON CHOPPER.

Application filed August 21, 1925. Serial No. 51,674.

This invention relates to new and useful improvements in a cotton chopper.

One object of the invention is to provide an implement of the character described whereby cotton, or other plants, growing in rows, may be chopped so as to remove the surplus plants and leave the others at spaced intervals along the row.

Another object of the invention is to provide an implement of the character described which will operate automatically, as the implement is moved along the row, to remove the surplus plants from the row.

A further feature of the invention resides in the provision of an implement of the character described which is of sturdy construction, and which is, at the same time comparatively simple and consequently may be cheaply produced.

With the above and other objects in view this invention has particular relation to certain novel features of construction, operation and arrangement of parts, an example of which is given in this specification and illustrated in the accompanying drawings, wherein:—

Figure 1:
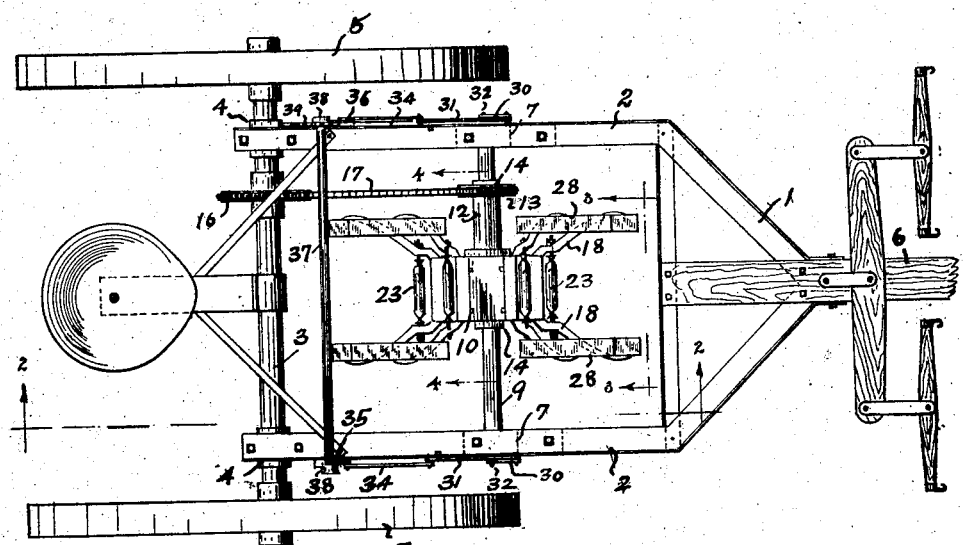
Figure 1 shows a plan view of the implement.
Figure 2:
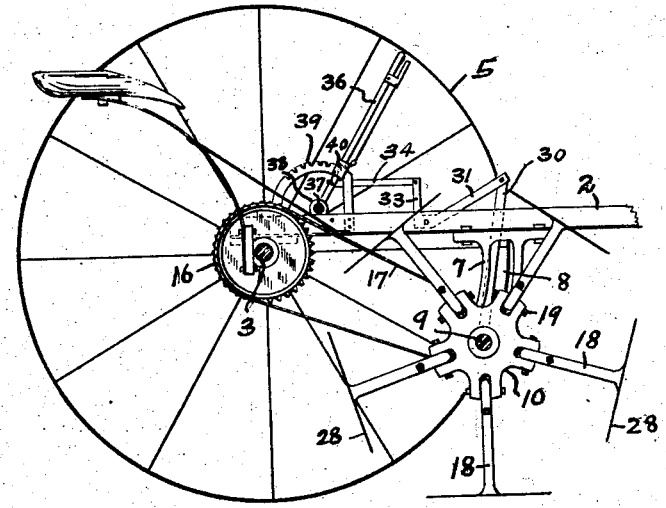
Figure 2 shows a sectional view taken on the line 2—2 of Figure 1.

Referring now more particularly to the drawings, wherein like numerals of reference designate similar parts in each of the figures, the numeral 1 designates the main frame, which is suitably braced and formed with the side members 2, 2. The frame is supported by the axle 3, which is rotatable in the bearings, 4, 4 carried by the side members 2, and the axle is, in turn carried by the ground wheels 5, 5. Attached to the front end of the frame there is a tongue 6 for the attachment of the draft animals thereto.

Depending from the respective side members 2 are the hangers members 7, 7, which have the arcuate bearings, as 8, therein, in which the respective ends of the cutter supporting rods 9 are mounted.

A cutter body 10 is rotatably mounted on this rod, and within this body there is a cam member 11, which is keyed on said rod.

Bolted to one side of the cutter body there is a sleeve 12 which has a bearing on the rod 9 and the outer end of which is formed with a sprocket wheel 13. The cutter body and its attached sleeve are retained in place by the thrust collars 14, 14 which are fastened on said rod by suitable set screws 15, 15.

The sprocket wheel 13 is aligned with a larger sprocket wheel 16 which is fixed on the axles and operating over these sprockets there is a chain 17 which transmits rotation from the latter to the former. The gear ratio is such that the cutter blades, hereinafter referred to, will revolve at the same rate of speed as the peripheries of the ground wheels.

At intervals around the cutter body there are the pairs of oppositely disposed, arcuate, outwardly curved cutter arms 18, 18. These are mounted to pivot on the pins 19 carried by said body and the arms of the respective pairs are connected by the strong pull springs 20, whose ends are attached to the respective rods 21, 21, which are fitted through bearings in said arms and are threaded to receive the adjusting nuts 22, 22, by means of which the tension of the springs may be varied.

These springs may be protected by flexible housings 23, if desired.

Radially movable in the cutter body are the cam followers 24, whose inner ends ride against the cam member 11 and are provided with roller bearings 25. The outer ends of these followers rest against the corresponding inwardly projecting fingers 26, 26 carried by the pivoted ends of the respective pairs of arms.

Figure 3:
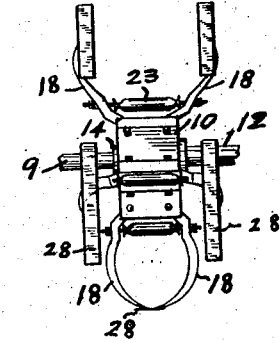
Figure 3 shows a front view of the cutter, looking as indicated by the line 3—3 of Figure 1.
Figure 4:
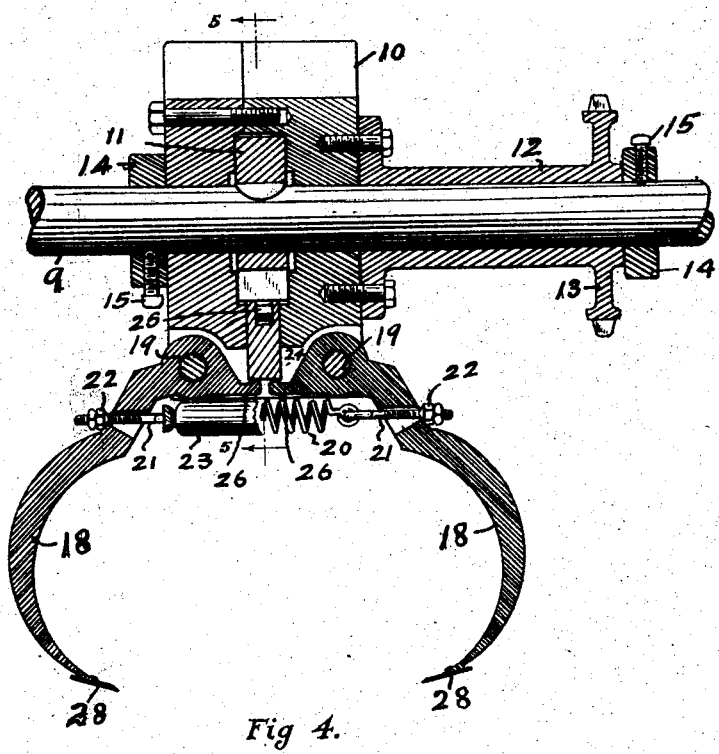
Figure 4 is an enlarged sectional view of the cutter taken on the line 4—4 of Figure 1.
Figure 5:
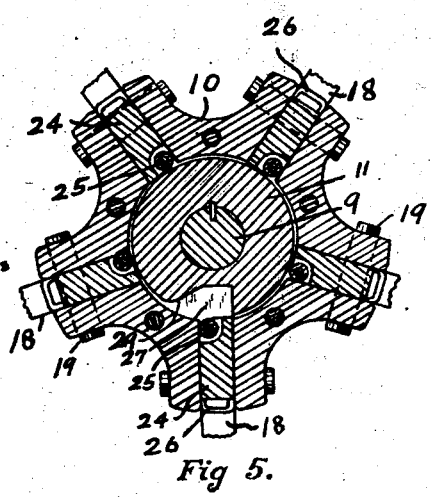
Figure 5 is a cross sectional view thereof, taken on the line 5—5 of Figure 4.

As the cutter body 10 rotates the followers 24 will be carried successively, into alignment with, and will drop into the peripheral notch 27, of the cam member, acting under the influence of the corresponding springs 20. The corresponding arms 18 being thus released suddenly close as shown in Figure 3. The free ends of these arms carry the sharp cutter blades 28, 28, which cooperate, when the arms are closed, to cut the plants between them out of the row. These blades close with a shear like action to prevent dulling of the edges and to more effectively sever the plants to be chopped out of the row.

The forward side of the notch 27 is formed into a cam face 29 which forces the cam followers 24 out, as the body 10 continues its rotation, and opens the arms 18, in succession, immediately after each chopping operation.

Provision has been made for elevating and lowering the cutter body and cutters. In order to accomplish this a bell crank is pivoted to each side member 2, and the links 30, 30, are pivoted at their upper ends to the forward ends of the arms 31, 31, of the respective bell cranks, and the ends of the rod 9 have pintles 32, 32 which work in corresponding bearings in the lower ends of said links. Pivoted at their forward ends to the other arms 33, 33, of said bell cranks are the links 34, 34 the rear ends of which are pivoted to the upper end of the arm 35 and the hand lever 36, respectively, which are fixed to the transverse shaft 37 rotatably mounted in bearings 38, 38, carried by the frame 1. There is a segmental rack 39, carried by the frame with which the hand operable dog 40, carried by said lever, cooperates in the usual rack-and-dog fashion. As the lever 36 is operated the cutter body and the cutters are correspondingly moved, said rod 9 moving in the arcuate bearings 8.

A preferred embodiment of the implement has been illustrated and described, but it is obvious that various mechanical changes may be made without departing from principle of the invention, and I hereby reserve the right to vary the construction so long as I do not depart from the scope of the appended claims.

What I claim is:

1. An implement of the character described including a frame, ground wheels supporting the frame, a cutter body carried by the frame, a cam member associated with said body, a plurality of pairs of cutters carried by said cutter body, a follower associated with each pair of cutters and normally held in position by said cam member to maintain the cutters in inactive position, means effecting relative movement of said body and cam member to release said followers successively from their respective pairs of cutters, means operatively connected with the cutters of the respective pairs and adapted to actuate them into co-operative relation when so released.

2. An implement of the character described including a frame, ground wheels supporting the frame, a cutter body carried by the frame, a cam member associated with said body a plurality of cutters carried by said body, a follower associated with each pair of cutters and normally held in position by said cam member to maintain the cutters in inactive position, means effecting relative movement of said body and cam member to release said followers successively from their respective pairs of cutters, means operatively connected with the cutters of the respective pairs and adapted to actuate them into co-operative relation when so released, and means for bodily adjusting said body and cutters, relative to the frame.

3. An implement of the character described including a frame embodying a supporting rod, ground wheels, a cutter body rotatable on said rod, a cam member fixed on said rod and housed within the body, a cutter carried by the cutter body, a follower radially movable within the body and associated with the cutter and normally held in position by said cam member to maintain the cutter in inactive position, means for rotating said body on said rod and thereby effecting the release of said follower from the cutter and means operatively connected with the cutter and adapted to actuate the same when so released.

4. In an implement of the character described a cutter body, a rod on which the body is rotatably mounted, a plurality of pairs of cutters carried by said body, a cam member fixed to said rod and housed within the body, a follower associated with each pair of cutters and normally held in position by said cam member to maintain the cutters in inactive position, said followers being radially movable within said body, means for rotating said body about said cam to release the followers successively from their respective pairs of cutters, means operatively connected with the cutters of the respective pairs and adapted to actuate them into cooperative relation when so released.

In testimony whereof I have signed my name to this specification.

MARCUS L. LANGFORD.